United States Patent [19]

Cretin et al.

[11] Patent Number: 4,636,992

[45] Date of Patent: Jan. 13, 1987

[54] DEVICE FOR SUPPLYING ELECTRIC POWER TO ELECTRONIC APPARATUSES OF AN ACOUSTIC WAVE RECEIVING ASSEMBLY OF GREAT LENGTH

[75] Inventors: Jacques Cretin, Le Chesnay; Claude Beauducel, Henouville; Jean Rudaz, Noisy S/Ecoles; Pierre Gonzalez, Rueil Malmaison, all of France

[73] Assignees: Institut Francais du Petrole, Rueil-Malmaison; Compagnie Generale de Geophysique, Massy, both of France

[21] Appl. No.: 404,102

[22] Filed: Jul. 30, 1982

[30] Foreign Application Priority Data

Jul. 31, 1981 [FR] France ................. 81 15085

[51] Int. Cl.[4] .................. G01V 1/38; G01V 1/22
[52] U.S. Cl. ........................ 367/20; 367/76
[58] Field of Search ............... 181/108, 111, 112, 122, 181/102; 340/856, 857, 858, 870.03, 870.39; 367/20, 22, 56, 57, 58, 78, 79, 80, 154, 135, 177, 25, 76; 361/110; 363/129; 307/13, 87; 174/103, 101.5, 115

[56] References Cited

U.S. PATENT DOCUMENTS

| 3,090,940 | 5/1963 | Vogel ............................ 174/113 R |
| 3,284,669 | 11/1966 | Boyd ............................. 340/856 |
| 3,439,165 | 4/1969 | Hopkinson et al. ................. 174/32 |
| 3,622,683 | 11/1971 | Roberts ........................... 174/103 |
| 3,965,394 | 6/1976 | Heinzman ......................... 361/110 |
| 4,016,468 | 4/1977 | Graf ............................... 363/129 |
| 4,110,554 | 8/1978 | Moore et al. .................... 174/101.5 |
| 4,157,535 | 6/1979 | Balkanli .......................... 340/857 |
| 4,178,579 | 12/1979 | McGibbeny et al. ............... 340/856 |
| 4,286,315 | 8/1981 | Johnson .......................... 363/129 |
| 4,390,974 | 6/1983 | Siems ............................. 367/76 |
| 4,408,246 | 10/1983 | Ray ............................... 361/87 |

Primary Examiner—Thomas H. Tarcza
Assistant Examiner—Daniel T. Pihulic
Attorney, Agent, or Firm—Millen & White

[57] ABSTRACT

A device for supplying electric power to electronic apparatuses of a seismic streamer of great length, comprises an electric feeding assembly associated with each electronic apparatus and including three voltage transformers whose primary windings are respectively fed from a generator with a different phase of a three-phase current, and whose secondary windings are respectively connected to three rectifier bridges supplying the required DC voltage to the electronic apparatus.

2 Claims, 2 Drawing Figures

DEVICE FOR SUPPLYING ELECTRIC POWER TO ELECTRONIC APPARATUSES OF AN ACOUSTIC WAVE RECEIVING ASSEMBLY OF GREAT LENGTH

BACKGROUND OF THE INVENTION

This invention relates to a device for supplying electric power to a receiving assembly of great length containing a plurality of electronic assemblies distributed over its whole length.

More particularly, the invention concerns an electric feeding device for data acquisition apparatuses arranged at regular intervals along a seismic streamer. Each acquisition apparatus is adapted to collect seismic signals generated by different receivers or receiver groups placed in adjacent elements of a seismic streamer, in response to echoes, from various reflecting or diffracting sub-soil layers, of acoustic waves generated by a seismic source, and to sequentially transmit said signals to a receiving and recording system placed on a vehicle on reception of appropriate orders. Apparatuses of this type are described in the published French Patent Application No. 2,471,088.

The electric supply of the electronic assemblies contained in the seismic streamers may be effected, for example, by a DC voltage ge generator connected to said assemblies through electric feeding cables of great length. The electronic assemblies may be connected in parallel to said feeding cables either directly or through transformers adapted to transform the DC feeding voltage to another DC voltage of lower amplitude.

This feeding system has the drawback of ohmic losses through the feeding cables which are very often of great length, resulting in voltage drops which reduce the actual voltage supplied to the electronic apparatuses connected to these cables at locations remote from the electric current generator, in proportion to the length of the seismic streamer. Another disadvantage of the DC supply is the possible occurence of electrolysis phenomena when moisture results in water condensation on electric contacts.

The electric supply of the electronic assemblies contained in the seismic streamer may also be effected by a generator of AC voltage connected to feeding electric cables of great length. The electronic assemblies are fed through AC voltage transformers whose primary windings are connected in parallel onto the feeding lines. This feeding type has also the disadvantage, resulting from the internal impedance of the feeding cables, of voltage drops which are higher the longer the cables, so that the apparatuses of the seismic streamer which are at great distance from the generator of AC voltage are liable to be insufficiently fed with electricity.

SUMMARY OF THE INVENTION

The device according to the invention avoids the abovementioned disadvantages. It is characterized in that it comprises a plurality of electric feeding assemblies associated respectively with the electronic apparatuses of a seismic streamer. Each of the assemblies comprises three AC voltage rectifiers whose positive and negative outputs are respectively connected to the secondary windings of three AC voltage transformers, the corresponding primary windings of the transformers of all the feeding assemblies being respectively connected in series onto three feeding cables, housed in the receiving assembly, which are connected respectively to means for generating three currents out of phase with respect to one another.

The use of a current generator for feeding in series the primary windings of a plurality of voltage transformers makes it possible to maintain constant voltages at the terminals of said windings, irrespective of the number of interconnected feeding assemblies. Accordingly, a very substantial lengthening of a seismic streamer fed by such a device may be effected without requiring any change in its feeding system.

Moreover, the use of three-phase currents results in a decrease of the cables overall impedance and of the parasitic inductances in the seismic data transmission cables also located in the seismic streamer.

BRIEF DESCRIPTION OF THE DRAWINGS

Other characteristics and advantages of the device will be made apparent from the following description of a preferred embodiment of the invention, given with reference to the accompanying drawings wherein.

DETAILED DISCUSSION OF THE INVENTION

Figure 1:
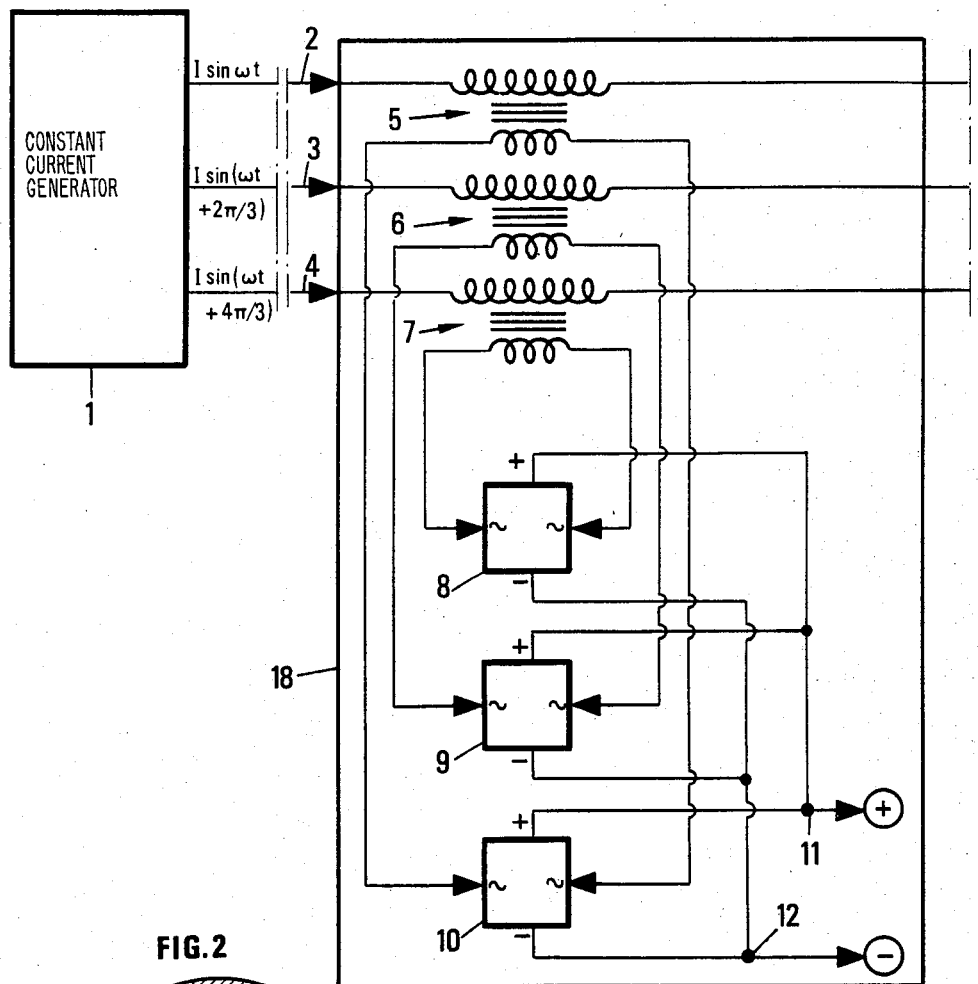
FIG. 1 shows a feeding assembly associated with each electronic apparatus of the streamer, as well as the feeding cables connected to a current generator.

The device according to the invention comprises (FIG. 1) a three-phase current generator feeding respectively three feeding cables 2, 3, 4 with currents $I_1 = I \sin \omega t$, $$I_2 = I \sin\left(\omega t + \frac{2\pi}{3}\right) \text{ and } I_3 = I \sin\left(\omega t + \frac{4\pi}{3}\right).$$

The feeding assembly 18 associated with each electronic apparatus comprises three voltage transformers 5, 6, 7 whose primary windings are respectively connected in series to the current feeding cables 2, 3, 4. The generator 1 being adapted to feed the cables with constant currents, irrespective of the number of voltage transformers arranged in series, the voltage at the terminals of the primary windings is constant. The secondary windings of the three transformers 5, 6, 7 are respectively connected to the input terminals of three bridge rectifiers 8, 9, 10. The output terminals with references + and − of the three bridge rectifiers are respectively interconnected to two terminals 11 and 12. The voltage between terminals 11 and 12 is used to feed with electric power the electronic apparatus associated with each feeding assembly.

Figure 2:
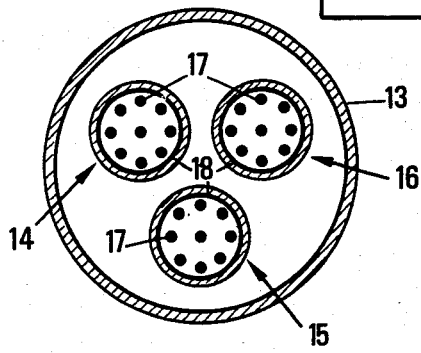
FIG. 2 shows a cross-sectional view of a preferred embodiment of electric feeding cables placed inside a seismic streamer.

The three feeding cables 2, 3, 4 are placed (FIG. 2) inside a seismic streamer defined by an external sheath 13. Usually a plurality of conductor wires are necessary to interconnect the different data acquisition apparatuses located at regular intervals along the seismic streamer. In such a case the latter is also provided with three cables 14, 15, 16 each comprising a plurality of conductors 17 surrounded by a shield 18 made up of, for example, a sheet of braided wires. The different conductors 17 of the three cables are used as transmission lines and the flexibles shields 18 of cables 14, 15, 16 form the feeding lines 2, 3, 4.

The use of the shields of three multiconductor cables 14, 15, 16 to feed the electronic apparatuses with three-phase currents has the double advantage of reducing to a minimum the parasitic inductances between the transmission lines and to avoid the use of three specific conductors for conveying the electric current.

We claim:

1. A device for supplying D.C. current to a plurality of remote acquisition devices located in a seismic streamer wherein data from the remote acquisition devices is transmitted to a central recording assembly located at the beginning end of the streamer, the device comprising:

a current generator for generating first, second and third A.C. currents out of phase with one another on three output lines;

three conducting sheaths extending within the seismic streamer, each of the three output lines being connected to one of the conducting sheath;

D.C. power assemblies at locations remote from the beginning of the streamer for providing D.C. current to the acquisition apparatuses, each D.C. power assembly being connected to one acquisition apparatus; each D.C. power assembly comprising three transformers each having a primary winding and a secondary winding with the primary windings being conducted in the three conducting sheaths, the primary windings fed through the same conducting sheath being serially connected; each power assembly further having three rectifier bridges with inputs for A.C. current and positive and negative outputs, the secondary winding of each transformer being connected across the A.C. inputs of one of the rectifying bridges, the positive outputs of the three rectifier bridges being connected to a positive terminal and the negative outputs of the three rectifier bridges being connected to a negative terminal to provide each D.C. power assembly with a D.C. output, the D.C. output of each D.C. power assembly being applied to a seismic acquisition apparatus.

2. A device for supplying D.C. electric power to electric acquisition apparatuses disposed at distance from one another along a seismic streamer said acquisition apparatuses collecting data from seismic transducers and sequentially transmitting data over transmission lines to a central recording assembly, said device comprising a central A.C. current generator generating first, second and third A.C. currents of substantially constant amplitude irrespective of the number of acquisition apparatuses to be fed with electric power, said first, second and third A.C. currents being out of phase with respect to one another, three output lines running along the seismic streamer, a plurality of electric power supply assemblies connected to said three output lines for supplying D.C. currents respectively to each one of said plurality of electronic apparatus of the seismic receiving system, said plurality of electric power supply assemblies comprising A.C. voltage transformer means and voltage rectifying means for converting A.C. voltage to D.C. voltage, said A.C. voltage transformer means in each assembly comprising three voltage transformers whose primary windings are respectively connected to said three feeding lines, the primary windings fed through a same feeding line being serially connected, and said voltage rectifiying means comprising three rectifier bridges with inputs for A.C. current from the secondary windings of the respective transformers and positive and negative outputs between which D.C. voltage is available for feeding the corresponding acquisition apparatus.

* * * * *